United States Patent
Tanaka et al.

(10) Patent No.: US 6,765,687 B2
(45) Date of Patent: *Jul. 20, 2004

(54) IMAGE PROCESSING METHOD AND APPARATUS

(75) Inventors: Noriaki Tanaka, Kawasaki (JP); Toshikazu Kinko, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,742

(22) Filed: Sep. 9, 1999

(65) Prior Publication Data

US 2004/0012814 A1 Jan. 22, 2004

(30) Foreign Application Priority Data

Sep. 10, 1998 (JP) .......................................... 10-256755
Oct. 27, 1998 (JP) .......................................... 10-306154

(51) Int. Cl.$^7$ ................................................. G06F 15/00
(52) U.S. Cl. ....................... 358/1.18; 358/1.13; 358/1.6; 358/1.3

(58) Field of Search ............................... 358/1.18, 1.13, 358/1.3, 1.6; 347/1, 16; 382/307, 305; 400/76, 61

(56) References Cited

U.S. PATENT DOCUMENTS

6,079,885 A * 6/2000 Sano .......................... 400/76
6,266,455 B1 * 7/2001 Kobayashi .................. 382/307

FOREIGN PATENT DOCUMENTS

| JP | 05-110817 | 4/1993 | ............ H04N/1/00 |
| JP | 07-319168 | 8/1995 | ............ B41S/21/00 |
| JP | 09-190546 | 7/1997 | .......... H04N/1/387 |
| JP | 10-051619 | 2/1998 | ............ H04N/1/46 |

* cited by examiner

*Primary Examiner*—Edward Coles
*Assistant Examiner*—Twyler Lamb
(74) *Attorney, Agent, or Firm*—Fitzpatrick, Cella, Harper & Scinto

(57) ABSTRACT

In order to prevent wasting of printing paper by reducing blank portions on the paper when an image to be printed is smaller than the paper, the size of a plurality of images designated to be printed out is compared with the size of the printing paper, the plurality of images are laid out so that as many as possible will fit on one sheet of the printing paper, and the images thus laid out are printed.

24 Claims, 14 Drawing Sheets

FIG. 2

IMAGE ID : A

VERTICAL SIZE : 100mm

HORIZONTAL SIZE : 150mm

COORDINATES ON PAPER : X=0(mm)
　　　　　　　　　　　　　Y=0(mm)

ROTATION : 0°

PRINTING PAPER

PRINTED IMAGE

PRINTING PAPER

PRINTED IMAGE

IMAGE PROCESSING METHOD AND APPARATUS

BACKGROUND OF THE INVENTION

This invention relates to an image processing method and apparatus for forming an image on a recording medium.

In a conventional image processing apparatus of this type, an image is entered as electronic information, manipulated and then formed on printing paper serving as the printing medium. Examples of such an apparatus are copiers, laser printers and ink-jet printers.

In a conventional image processing apparatus of this type, when printing a plurality of images, each of which is small in comparison with the printing paper is specified, the paper may remain mostly blank, as shown in FIG. 19. If large number of said pages are printed, this results in a great amount of wasted printing paper.

SUMMARY OF THE INVENTION

Accordingly, an object of the present invention is to provide an image processing method and apparatus in which an image can be recorded on a printing medium efficiently through a simple operation.

According to the present invention, the foregoing object is attained by providing an image processing method for printing a plurality of images on a printing medium of a predetermined size, comprising: a comparison step of calculating image size from data representing the plurality of images and comparing this size with the size of the printing medium, and a layout step of deciding a layout of the plurality of images on the printing medium based upon result of the comparison performed at the comparison step.

According to the present invention, the foregoing object is attained by providing an image processing apparatus for printing a plurality of images on a printing medium of a predetermined size, comprising: comparison means for calculating image size from data representing the plurality of images and comparing this size with the size of the printing medium, and layout means for deciding a layout of the plurality of images on the printing medium based upon result of the comparison performed by said comparison means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram describing a script in page description language according to the first embodiment;

DESCRIPTION OF THE PREFERRED EMBODIMENTS

Preferred embodiments of the present invention will be described in detail with reference to the drawings. It should be noted that the scope of the present invention is not limited to the relative placement of the structural elements, the equations and the numerical values set forth in these embodiments unless there is a specific recitation stating otherwise.

First Embodiment

Figure 1:
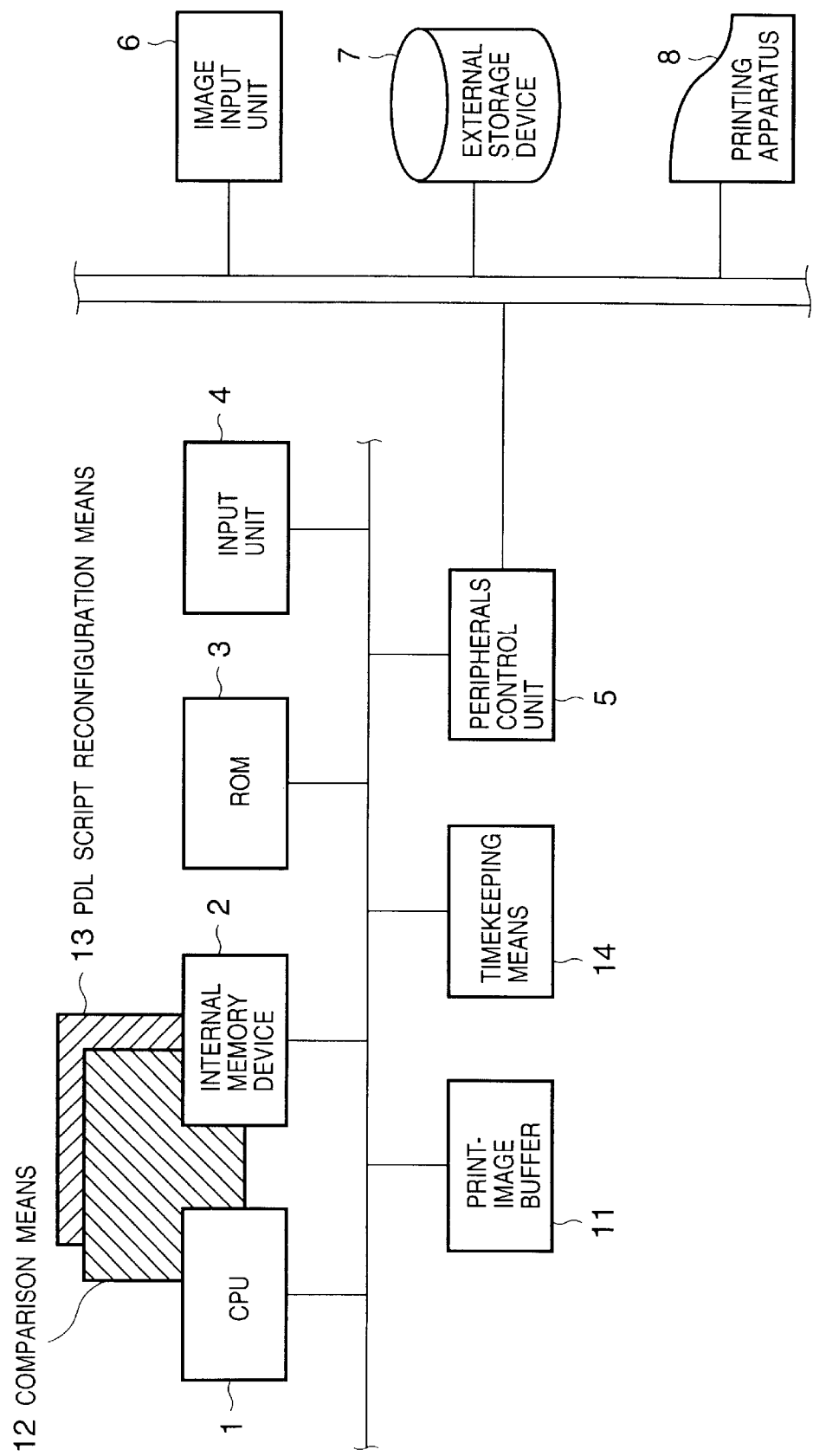
FIG. 1 is a block diagram illustrating an image processing apparatus according to a first embodiment of the present invention.

FIG. 1 is a block diagram showing the internal structure of an image processing apparatus according to a first embodiment of the present invention.

As shown in FIG. 1, the apparatus includes a CPU (central processing unit) 1, an internal memory device 2 such as a RAM connected directly to a CPU bus and used as the working area of the CPU 1, and a ROM 3, constituted by, e.g., a CD-ROM drive. The execution program code of the CPU 1 is read out of a recording medium such as the CD-ROM on which the code has been stored. Various processing described in this embodiment is executed by the CPU 1 in accordance with the program code stored on the CD-ROM. An input unit 4, such as a keyboard and mouse, is employed by the user to apply various commands to the image processing apparatus. The peripherals control unit 5 is a controller for supervising control of peripherals and is typified by a Centronics interface or SCSI, etc. The above-mentioned CPU 1, internal memory 2, ROM 3, input unit 4 and peripherals control unit 5 can be substituted by a general-purpose personal computer.

An image input unit 6 reads various images on photographic film, silver-halide film and the like and converts these images to electrical signals. The apparatus is connected to an external storage device 7 such as a hard disk and to a printing apparatus 8, such as a color ink-jet printer, color laser printer or color LED printer.

The apparatus further includes a print-image buffer 11 for temporarily accumulating and storing a print image. Numeral 12 denotes comparison means for comparing paper size and image size, and numeral 13 denotes PDL (Page Description Language) reconfiguration means. These actually are functions implemented by the CPU 1 and internal memory 2, etc. It should be noted that the program code of the comparison means 12 and PDL reconfiguration means 13 also is recorded on the above-mentioned CD-ROM. Numeral 14 denotes timekeeping means typified by a real-time clock.

The operation of the image processing apparatus according to this embodiment will now be described. In the present apparatus, an original image is input to the external storage device 7 by the image input unit 6, the operator uses the input unit 4 to enter various commands for editing the image, then the operator uses the input unit 4 to command that the edited image be output to the printing apparatus 8, whereby the desired output is obtained. The flow of processing from issuance of the printing command onward will now be described in detail.

First, images to be printed are successively stored in the print-image buffer 11 temporarily. At this time an image ID which identifies each image is stored in the print-image buffer 11 at the same time. Next, the CPU 1 acquires the sizes of the image in the vertical and horizontal direction from the image that has been stored in the print-image buffer 11. The CPU 1 then generates PDL script having auxiliary information for printing image data of an appropriate size and in an appropriate orientation and stores the script in the internal memory 2. As shown in FIG. 2, attribute information such as ID of an image to be printed, size of the image in the vertical direction, size of the image in the horizontal direction, coordinates on the printing paper and angle of rotation of the image is described in the PDL script.

Next, the CPU 1 compares the size of the printing paper and the image size and determines whether the image size is sufficiently small with respect to the size of the printing paper. Specifically, the CPU 1 determines whether the height of the image in the vertical direction is equal to or less than half the dimension of the printing paper in the vertical direction. If the result of this determination is that the height of the image in the vertical direction is greater than half the height of the printing paper in the vertical direction, then the image is printed singly by the printing apparatus 8 and processing is terminated.

Figure 3:
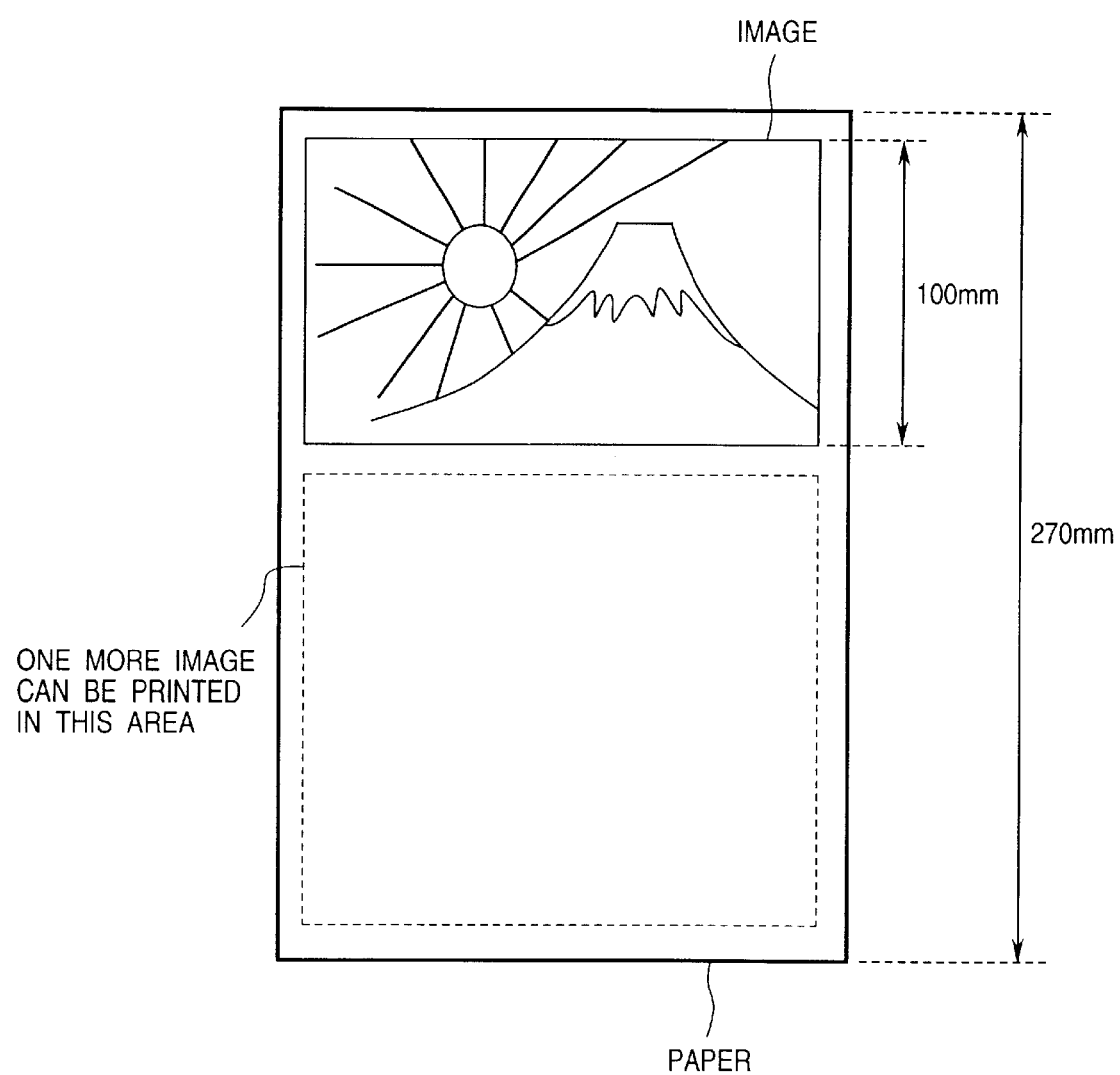
FIG. 3 is a diagram describing a print image size and printing paper size according to the first embodiment.

On the other hand, in a case where it is determined that the height of the image in the vertical direction is not greater than half the dimension of the printing paper in the vertical direction, as shown in FIG. 3, the CPU 1 waits for the next image to be printed without transferring this image to the printing apparatus 8 immediately.

The timekeeping means 14 starts measuring time after printing of the earlier image is commanded. If printing of the later image is not commanded upon elapse of a predetermined time T then this image alone is printed by the printing apparatus 8. If the image data, designated for printing next, arrives before the time T elapses, then PDL script is generated for this image in a manner similar to that described above. In order that these two images may be laid out on the same sheet of printing paper, the PDL scripts of these two images are reconfigured. Processing for reconfiguring the PDL script will be described with reference to the flowchart of FIG. 4. The image that arrives first shall be referred to as image A, and the image that arrives next shall be referred to as image B.

Step S401 of the flowchart calls for the size of image A in the vertical direction and the size thereof in the horizontal direction to be compared. If it is determined that the vertical dimension is larger, the vertical and horizontal sizes of image A are interchanged and the angle of rotation is set to 90° C. Similarly, the size of image B in the vertical direction and the size thereof in the horizontal direction are compared at step S403. If it is determined that the vertical dimension is larger, the vertical and horizontal sizes of image B are interchanged and the angle of rotation is set to 90° C.

This is followed by step S405, where it is determined whether the sum of the vertical sizes of images A and B fits within the vertical size of the printing paper, and then by step S406, where it is determined whether the sizes of images A and B in the horizontal direction fits within the horizontal size of the printing paper. If a "NO" decision is rendered at step S405 or S406, then images A and B are each printed separately and processing is terminated.

If "YES" decisions are rendered at both steps S405 and S406, then the PDL scripts of the images A and B are reconfigured in order to be united and the Y coordinate of image B is replaced by the vertical size of image A at step S407.

Figure 5:
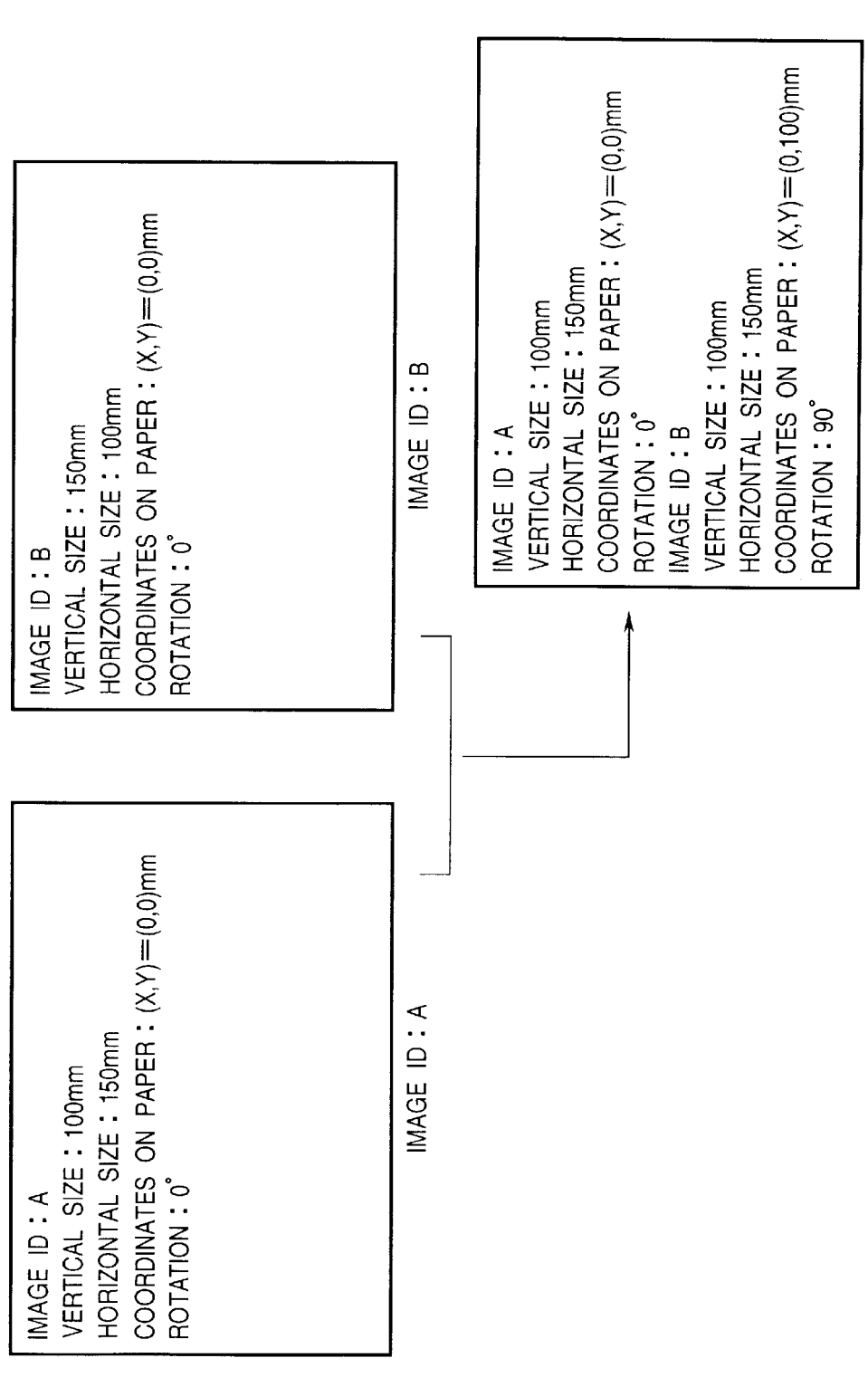
FIG. 5 is a diagram describing a script in page description language that has been reconfigured according to the first embodiment.
Figure 6:
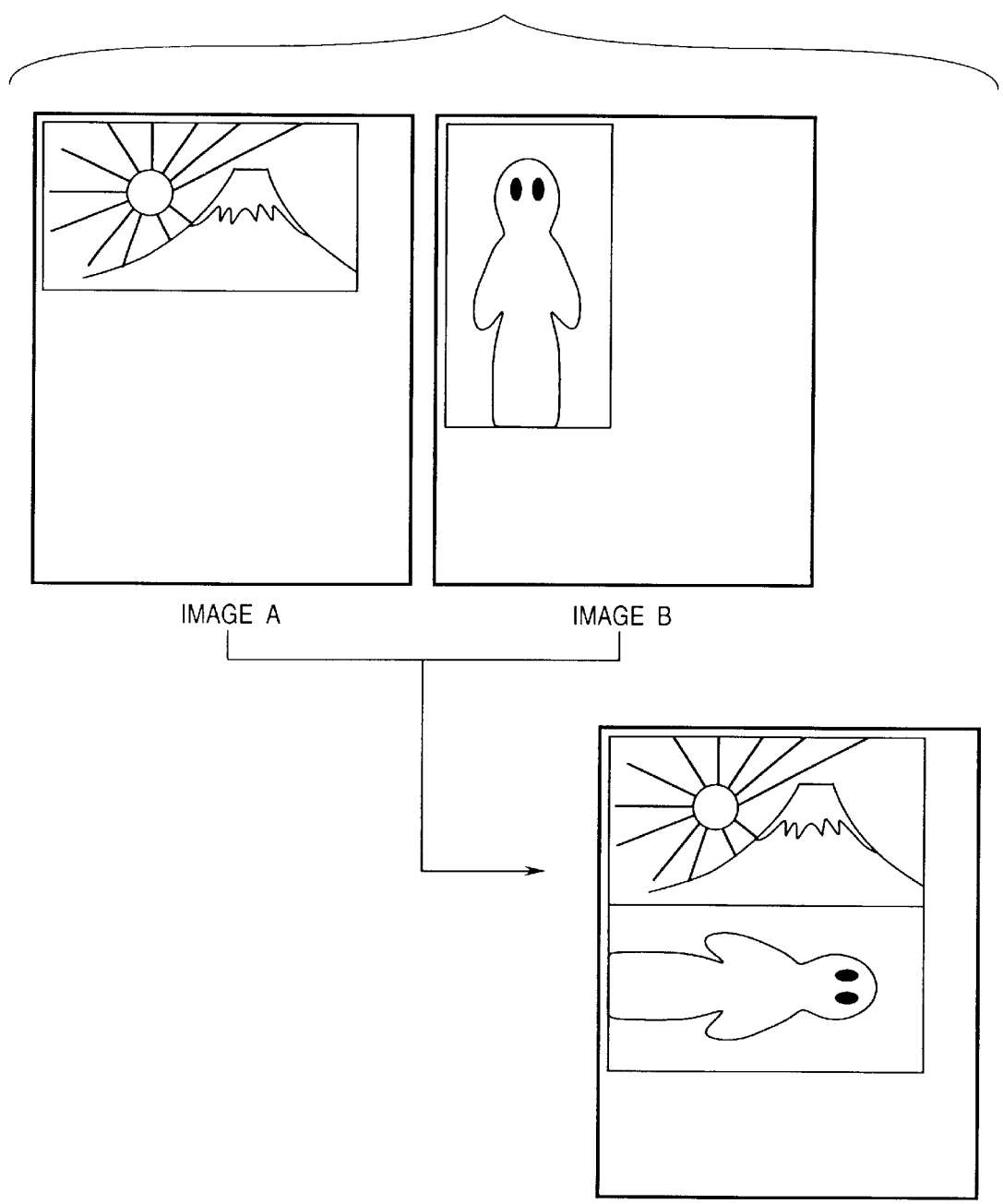
FIG. 6 is a diagram illustrating the result of printing according to the first embodiment.

The PDL script thus reconfigured is shown in FIG. 5.

Figure 8:
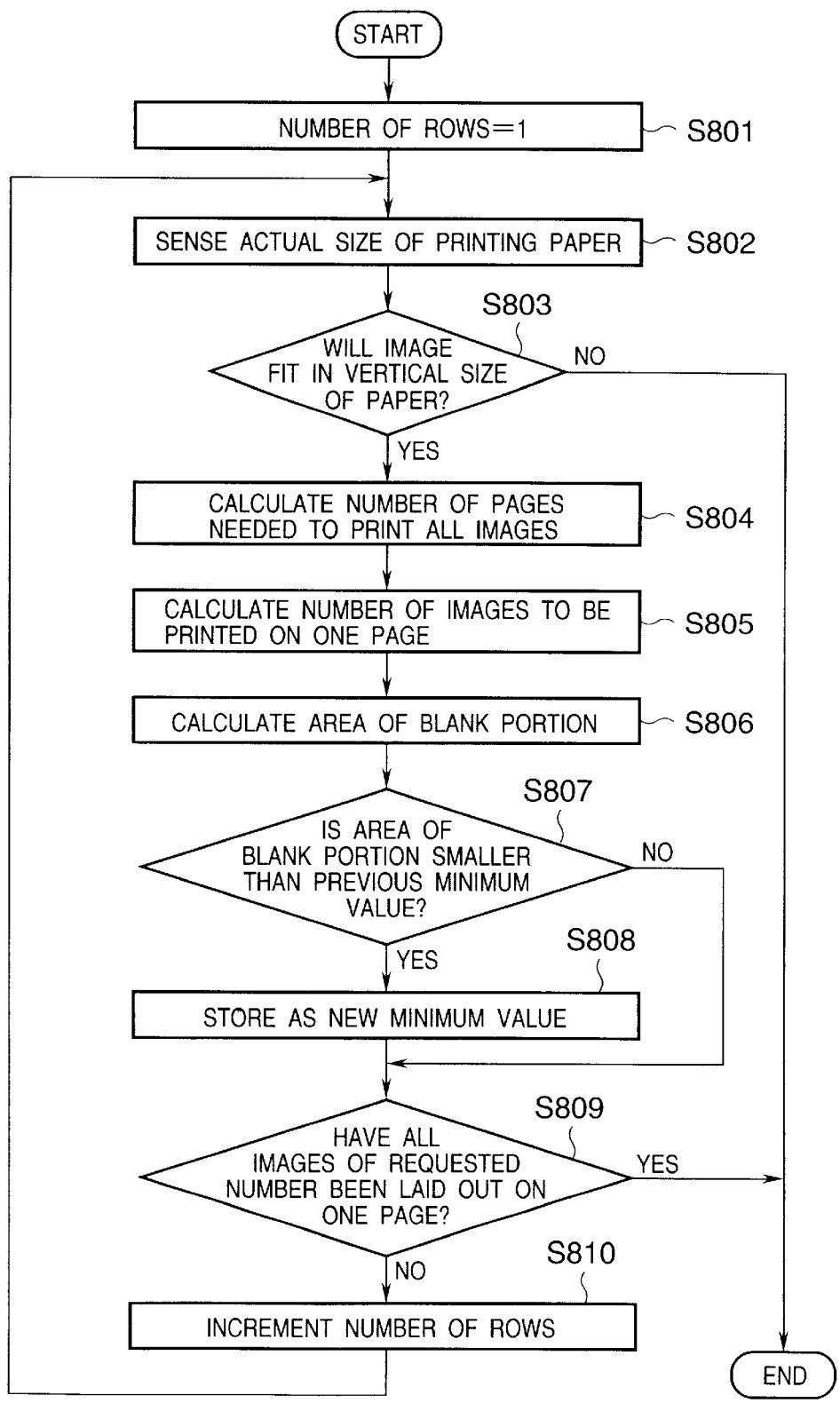
FIG. 8 is a flowchart illustrating the details of processing for determining optimum layout of images according to the second embodiment.

The reconfigured PDL script is sent to the printing apparatus 8 via the peripherals control unit 5 together with the image data. The printing apparatus 8 executes print processing based upon the reconfigured PDL, whereby the output image is obtained. FIG. 8 illustrates the result of printing.

Though a preferred embodiment of the present invention is as described above, various modifications are possible. For example, the CPU 1, image input unit 6, external storage device 7 and printing apparatus 8 may be connected not only directly but also remotely via a network such as the Internet.

An arrangement may be adopted in which there is provided an additional mode for executing printing processing immediately, to thereby place greater emphasis on speed, even in a case where the size of image A is sufficiently small in comparison with the size of the printing paper. In such an arrangement it would be possible to select this mode or the above-described mode which emphasizes efficient utilization of paper, with the mode being changed over on an image-by-image basis, by way of example. As a result, an image which the user wishes to print out quickly can be printed out without sacrificing speed.

In this embodiment, an example in which the CPU 1, internal memory 2, ROM 3, input unit 4 and peripherals control unit 5 are replaced by a general-purpose personal computer. However, the invention may of course be implemented by special-purpose hardware.

In accordance with this embodiment, blank areas on printing paper can be reduced in a case where images considerably smaller than the size of the printing paper are printed. This makes it possible to raise yield by preventing the wasting of printing paper.

Further, by comparing the size of the image whose printing has been commanded and the size of the printing paper and storing the image in storage means in dependence upon the result of the comparison, an image that is relatively large in comparison with the size of the printing paper can be printed out immediately without waiting for the next image.

Further, when a plurality of images are laid out, the vertical and horizontal sizes of the images are compared and the images are rotated and laid out in dependence upon the comparison, thereby making efficient layout possible.

Further, when a plurality of images are laid out, attribute information such as PDL script is manipulated and not the image data itself. As a result, computer resources are not expended and processing can be executed promptly.

Further, providing timekeeping means makes it possible to achieve both effective utilization of printing paper and speedy printing.

Second Embodiment

A second embodiment of the present invention will now be described. In the first embodiment, a plurality of different images are laid out on one sheet of printing paper. In the second embodiment, however, a plurality of copies of the same image are laid out on one sheet of printing paper.

The overall construction of the image processing apparatus is the same as that of the first embodiment shown in FIG. 1. In the second embodiment, however, the operator uses the input unit 4 such as the keyboard to specify an image and the number of copies thereof to be printed, and the CPU 1 decides positional coordinates of each image on paper and other auxiliary information in such a manner that images of the specified number of copies can be printed efficiently with the optimum layout.

Processing for achieving optimum layout of images on printing paper will be described with reference to FIG. 7.

Figure 7:
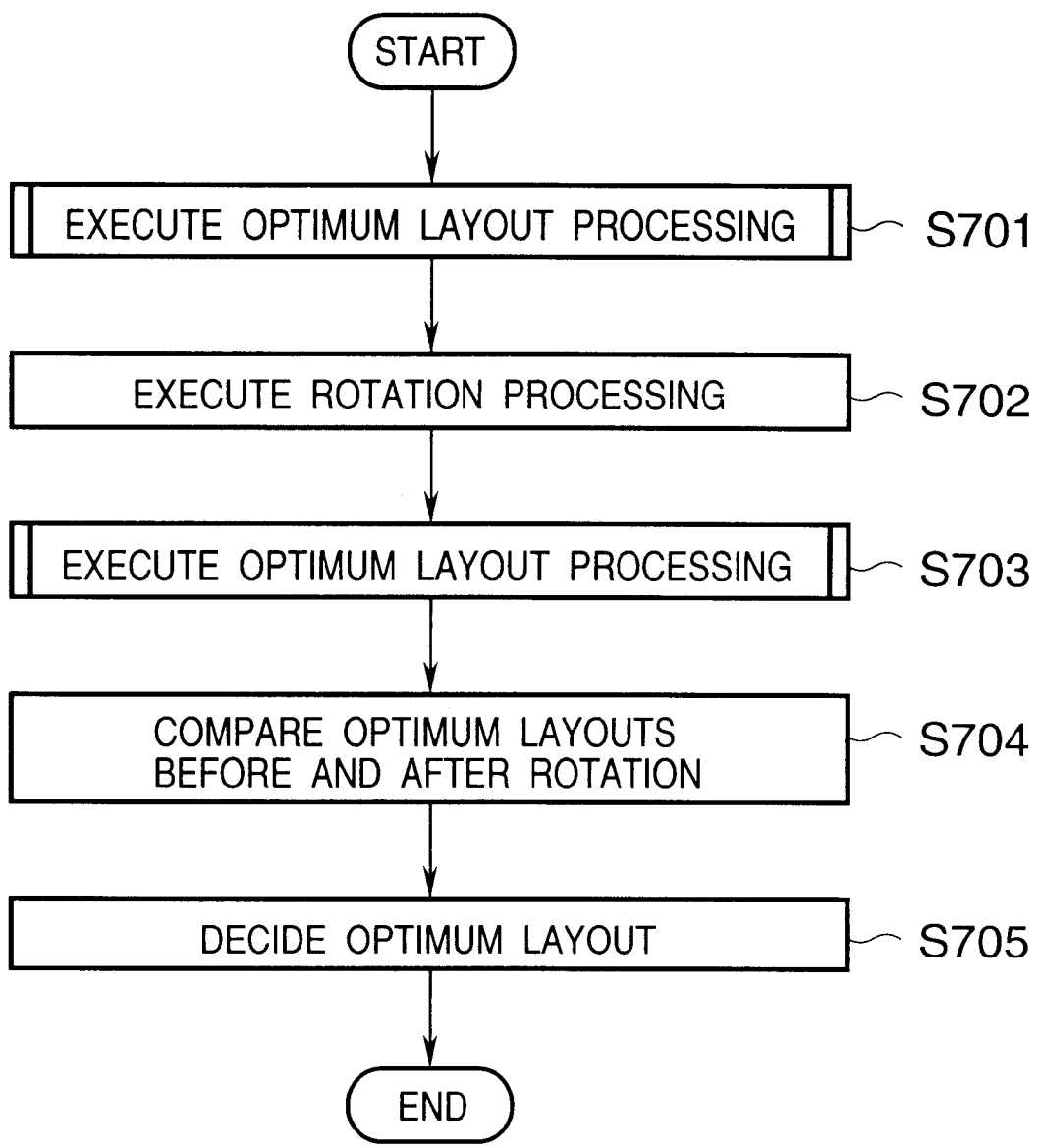
FIG. 7 is a flowchart illustrating overall processing for determining optimum layout of images according to a second embodiment of the present invention.

FIG. 7 is a flowchart illustrating an overview of processing for achieving optimum layout of images according to the second embodiment.

To determine the optimum layout of images, the first step (step S701) is to determine optimum layout of images in a case where the image that has been stored in the external storage device 7 is laid out, in its current orientation, on the printing paper. After processing for rotating the image data in the buffer 90° C. is executed (step S702), the optimum layout is determined again in a similar manner (step S703). By comparing the two layouts (step S704) obtained at steps S701 and S703, the final layout is decided (step S705). The optimum layout is that which will minimize the area of the printing paper on which images are not printed. For the sake of convenience, the former orientation (orientation before rotation) shall be referred to as the "unrotated orientation", and the latter orientation (orientation after rotation) shall be referred to as the "rotated orientation".

The details of the flow of processing for optimum layout of images will be described with reference to FIG. 8.

Figure 9A:
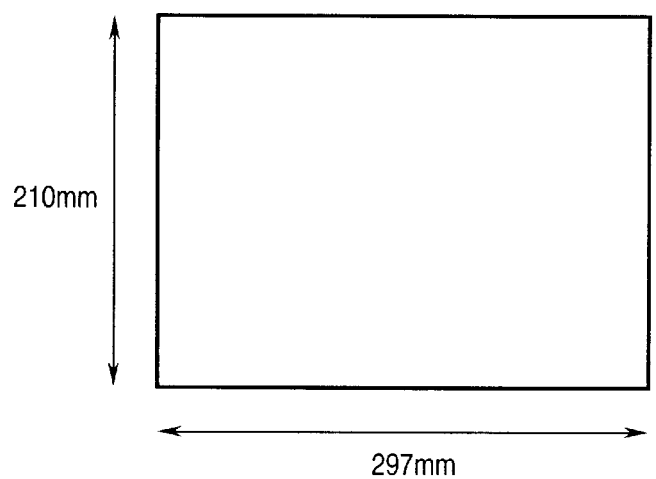
FIGS. 9A, 9B illustrate the relationship between the size of an image in an unrotated orientation and the size of a printing medium according to the second embodiment.
Figure 9B:
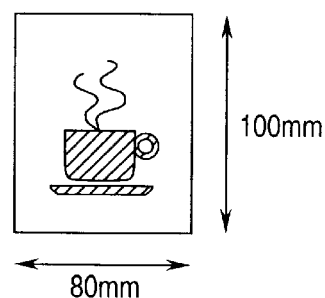

FIG. 8 is a flowchart illustrating the content of step S701 (which is the same as that of step S703) in FIG. 7. The description that follows is for a case where size A4 paper is used as the printing paper. Specifically, the long and short sides of the printing paper are assumed to have lengths of 297 and 210 mm, respectively (see FIG. 9A). Further, the orientation of paper feed in the printing apparatus is assumed to be landscape orientation. That is, the paper is oriented such that its short edge is vertical and its long edge horizontal. Furthermore, it is assumed that the size of the original image is 100 mm vertically and 80 mm horizontally, and that the apparatus has been instructed to print six copies of this image (see FIG. 9B).

The overall flow of processing for optimum layout of images involves starting from a case where images are arranged in one row with respect to the direction in which the printing paper is fed, increasing the number of rows one at a time, comparing one orientation to the next in terms of the arithmetic area of the portion of the paper on which images are not printed (i.e., the area of the blank portion), and adopting as the optimum layout that which minimizes the blank portion.

When processing for optimum layout of images starts, first the number of rows on which images are printed on the printing paper is set to one (S801). That is, it is assumed that images will be printed on the printing paper so as to form one horizontal row. This is followed by step S802.

The actual size of the printing paper is sensed at step S802. In this embodiment, the printing paper is sensed as being of size A4.

Next, the size of the printing paper in the vertical direction and the size of the image area in the vertical direction are compared (S803). Since the number of rows initially is one, the size of the printing paper in the vertical direction is 210 and the size of the image in the vertical direction is 100 mm, the image will fit into the space of the printing paper in the vertical direction. Control then proceeds to step S804.

The number of pages necessary to print all specified copies of the image is calculated at step S804.

Figure 10:
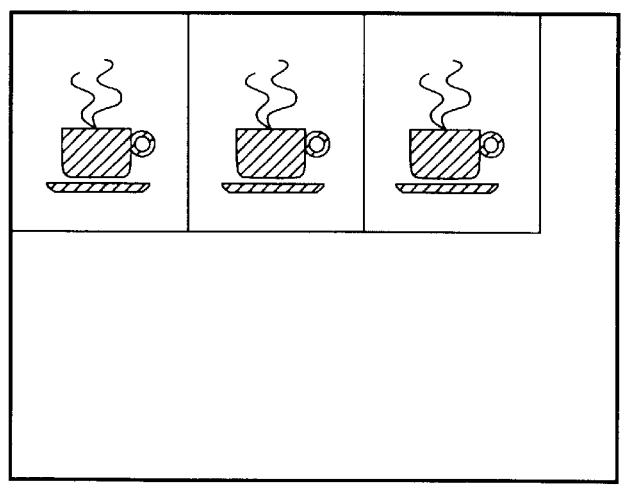
FIG. 10 is a diagram illustrating image layout in a case where images are printed on one row in an unrotated orientation according to the second embodiment.

The number of rows currently is one. On the basis of the size of the printing paper in the horizontal direction and the size of the image in the horizontal direction, three images will fit on the single row (see FIG. 10). In order to print six copies requested for printing, therefore, two sheets of printing paper will be required.

Next, the number of images printed on one page is adjusted (S805). In a case where printing is performed over a plurality of pages, the minimum necessary number of images for printing all requested copies is assigned to one page. For example, if four copies of an image are to be printed, unbalanced printing, such as printing three copies on one of two sheets of printing paper and one copy on the other sheet, is avoided. An adjustment is made in such a manner that two copies will be printed on each of the two sheets of printing paper. In the case of this embodiment, three copies are printed on each sheet of printing paper and no adjustment is required.

Next, the arithmetic area of the blank portion is calculated (S806). First, in regard one sheet of printing paper, the area is $$297 \times 210 = 62{,}370 \text{ mm}^2$$

the area occupied by the images is $$80 \times 100 \times 3 = 24{,}000 \text{ mm}^2$$

and the area of the blank portion is $$62{,}370 - 24{,}000 = 38{,}370 \text{ mm}^2$$

Since two pages are printed overall, the total area of the blank portions is $$38{,}370 \times 2 = 76{,}740 \text{ mm}^2.$$

For the time being, this value is treated as being the minimum value and is stored (S808).

Next, at step S809, it is determined whether all of the requested number of copies have been laid out on one page of the printing paper. If the decision rendered is "YES", this loop of processing is exited.

In this case, the number of images printed on one page is three, meaning that the condition of step S809 is not satisfied. As a consequence, control proceeds to step S810. Here the number of rows is incremented to two rows. Control then returns to step S802.

After control returns to step S802, the comparison with the size of the printing paper is made at step S803. When the total height of the images on the two rows and the size of the printing paper in the vertical direction are compared, we have $$100 \times 2 = 200 \text{ mm} < 210 \text{ mm}$$

and therefore control proceeds to step S804.

Figure 11:
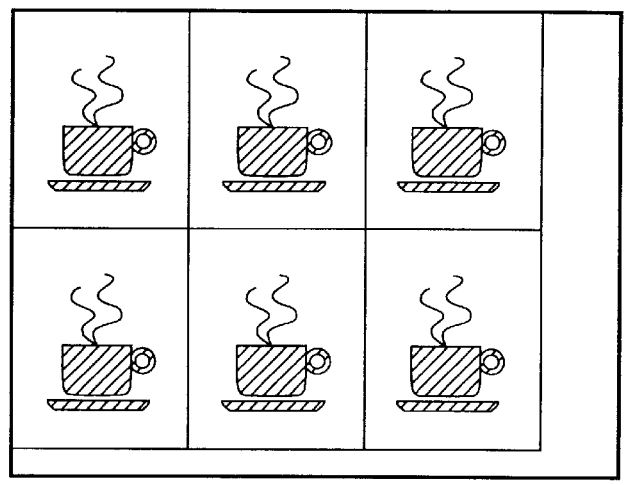
FIG. 11 is a diagram illustrating image layout in a case where images are printed on two rows in an unrotated orientation according to the second embodiment.

Since the number of rows is now two, the number of images that can be printed on one page of printing paper is six (see FIG. 11) and therefore it is found at step S804 that all required images can be printed on one page.

Now the area of the blank portion is $$62{,}370 - 8000 \times 6 = 14{,}370 \text{ mm}^2$$

The area of the blank portion and the minimum value (76,740 mm$^2$) of the previous cycle are compared at step S807. Since the current area is smaller, this is adopted as the new value and is stored.

Since it is found at step S809 that the requested number of images have been laid out on one page of the printing paper, the routine for determining layout for the unrotated orientation is terminated. By virtue of such processing, it is determined that the method of layout that provides the highest efficiency for the unrotated orientation is that which disposes six images on one page.

Figure 12A:
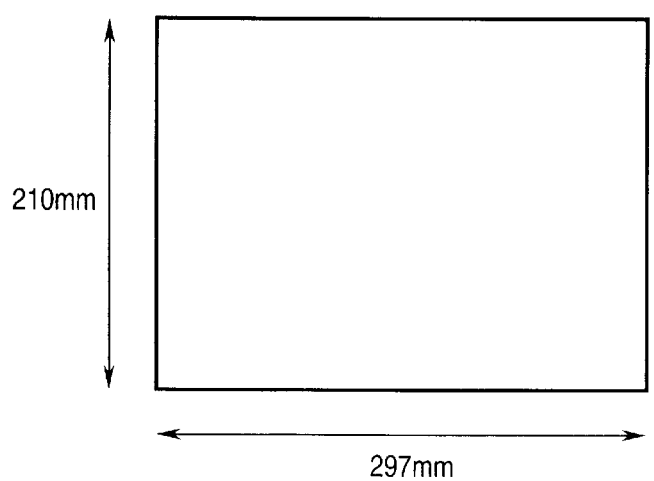
FIGS. 12A, 12B illustrate the relationship between the size of an image in a rotated orientation and the size of a printing medium according to the second embodiment.
Figure 12B:
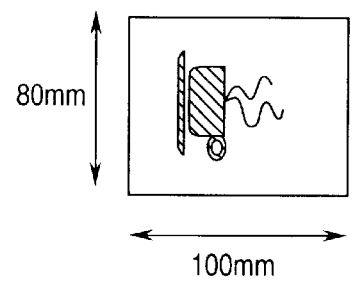

The processing of pages S801 to S810 is executed in similar fashion in regard to layout for the rotated orientation and the optimum layout for this orientation is decided. The layout in the case of the rotated orientation is considered upon interchanging the sizes of the image in the vertical and horizontal directions. That is, the relationship between the size of the original image and the size of the printing paper becomes as shown in FIGS. 12A, 12B.

In all other respects the optimum layout is decided in accordance with a procedure that is exactly the same as that used in the case of the unrotated orientation. In other words, when the number of rows is one, two images are laid out on one page and three of these pages are printed.

The area of the blank portions in this case is $$(62{,}370 - 8000 \times 2) \times 3 = 139{,}110 \text{ mm}^2$$

Next, when the number of rows is two, the number of pages of printing paper necessary is calculated as being two at step S804 and the number of images to be printed on one page of printing paper is decided as being three at step S805. The area of the blank portions in this case is $$(62{,}370 - 8000 \times 3) \times 2 = 76{,}740 \text{ mm}^2$$

Since the condition of step S809 is not satisfied when there are two rows, control proceeds to step S810, where the number of rows is incremented to three. However, since the total height of the images will now be 240 mm, it is found at step S804 that this exceeds the vertical size of the printing paper and, hence, processing is terminated.

Figure 13:
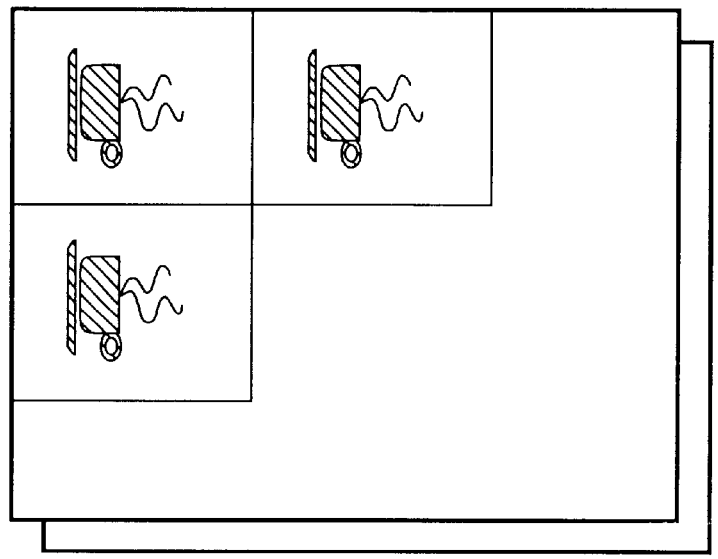
FIG. 13 is a diagram illustrating image layout in a case where images are printed on two rows in a rotated orientation according to the second embodiment.

Thus, the optimum layout decided in the case of the orientation is to place three images on one page and print two such pages (see FIG. 13).

When the arithmetic areas of the blank portions are compared in the optimum layouts for the unrotated and rotated orientations at step S704 in FIG. 7, it is found that the area of the blank portion is smaller for the unrotated orientation. Accordingly, it is finally decided (S705) that the layout for the best efficiency is that which places six images on one page and prints one such page. In other words, the orientation in this case is the unrotated orientation.

In accordance with the layout thus decided, such information as the number of images to be printed on one sheet of printing paper, the coordinates of the starting position of each image on the sheet of printing paper and the number of sheets of printing paper required is delivered to means altering printing information.

Figure 14:
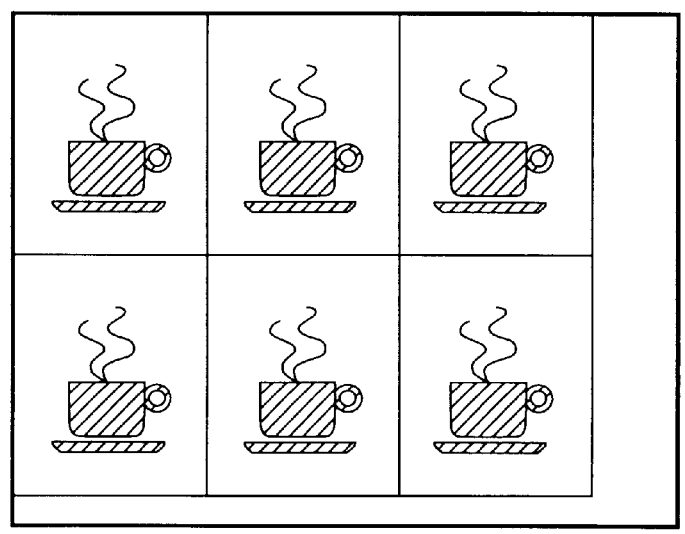
FIG. 14 shows the result of printing according to the second embodiment.

Furthermore, in a case where printing of crossmarks which indicate the cutting positions between adjacent images has been specified, the coordinates of the four corners of each image are delivered, together with the crossmark printing command, as crossmark printing information. The final printed result is as shown in FIG. 14.

Thus, as described above, images are arrayed so as to minimize the blank portion on printing paper having a prescribed size. As a result, it is possible to form images efficiently without wasting printing paper.

Third Embodiment

A third embodiment of the present invention will now be described. In the second embodiment, sheets of paper cut to size A4 are used as the printing paper. In the third embodiment, rolled paper from which sheets of paper cut to size A4 can be cut off is used as the printing paper.

In a case where the rolled paper is used, the paper is cut by a cutter at an arbitrary position at the end of printing. However, it is assumed that the minimum length of the paper is 100 mm in terms of the physical limits of the printing apparatus. In regard to the image size, it is assumed that the size in this embodiment is the same as that in the second embodiment. Also, it is assumed that the number of print copies specified is four.

Considered first will be the decision regarding optimum layout in the case of the unrotated orientation. The decision step is the same as that of the second embodiment (see FIG. 8) for both the unrotated and rotated orientations.

The size of the printing paper is calculated at step S802. Since the paper will be cut following printing, the size of the printing paper in the vertical direction is the same as that of the image, namely 100mm.

After the "YES" decision is rendered at step S803, it is determined at step S804 that the number of pages is two.

Figure 15:
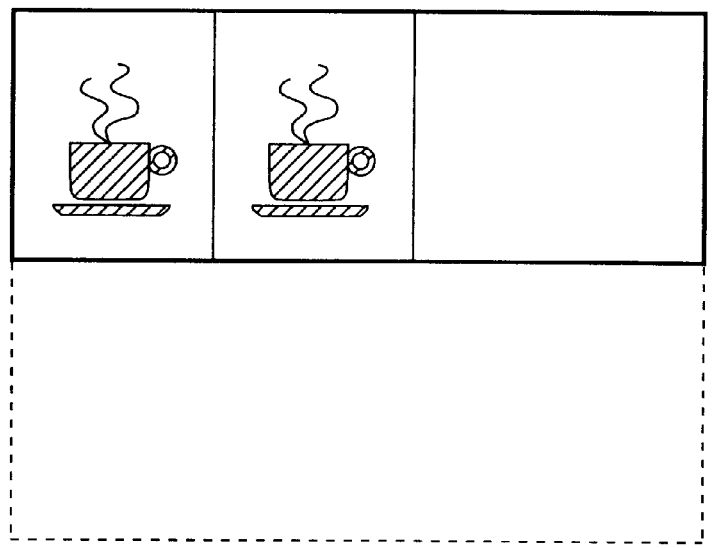
FIG. 15 illustrates an image layout in a case where images are printed on one row in an unrotated orientation according to a third embodiment of the present invention.

This is followed by step S805, at which the number of images to be printed on one page is adjusted. Since the requested number of images is four and the number of printed pages is two, it is calculated that two images will be printed on one page (FIG. 15).

The area of the blank portion is calculated at step S806. Since the area of the printing paper is $$297 \times 100 = 29{,}700 \text{ mm}^2$$

the area of the blank portion per page is $$29{,}700 - 8000 \times 2 = 13{,}700 \text{ mm}^2$$

Doubling the number of pages gives $$13{,}700 \times 2 = 27{,}400 \text{ mm}^2$$

which is the value in a case where images are printed on one row.

Figure 16:
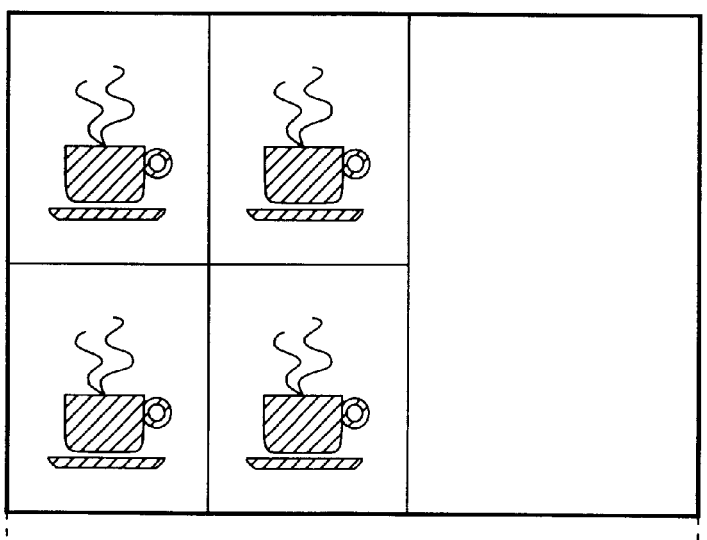
FIG. 16 illustrates an image layout in a case where images are printed on two rows in an unrotated orientation according to the third embodiment.

Next, when the number of rows is incremented to two (see FIG. 16), the actual height of the paper at step S802 becomes 100×2=200 mm and the area of the paper becomes 297×200=59,400 mm²

The number of printed pages is one, and the area of the blank portion is 59,400−8000×4=27,400 mm²

This is the same as in the case where the number of rows is one.

Which is selected in this case depends upon other criteria, though the selection preferably is made in conformity with the specifications of the application. Here it is assumed that the layout having two rows is selected.

Next, the optimum layout is determined in regard to the rotated orientation.

In the case of the layout having one row, the actual height of the paper calculated at step S802 is not 80 mm but 100 mm owing to the aforesaid physical limitations of the printing apparatus. The area of the paper is 297×10=29,700 mm²

Figure 17:
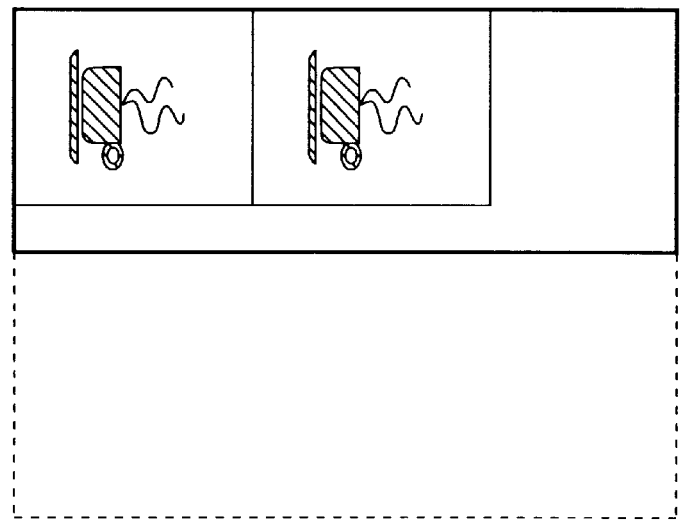
FIG. 17 illustrates an image layout in a case where images are printed on one row in a rotated orientation according to the third embodiment.

In this case, the number of images that fits on one row is two and the number of pages to be printed is two (see FIG. 17). Accordingly, the area of the blank portion is (29,700−8000×2)×2=27,400 mm²

Next, when the number of rows is incremented to two, the height of the paper becomes 160 mm, and therefor the area of the paper is 297×160=47,520 mm²

Here the layout of the images is four on one page (see FIG. 18) and the number of pages to be printed out is one. Accordingly, the area of the blank portion is 47,520−8000×4=15,520 mm²

Since this area is smaller than that in the case of one row (27,400 mm²), this layout is selected as the optimum layout.

Figure 18:
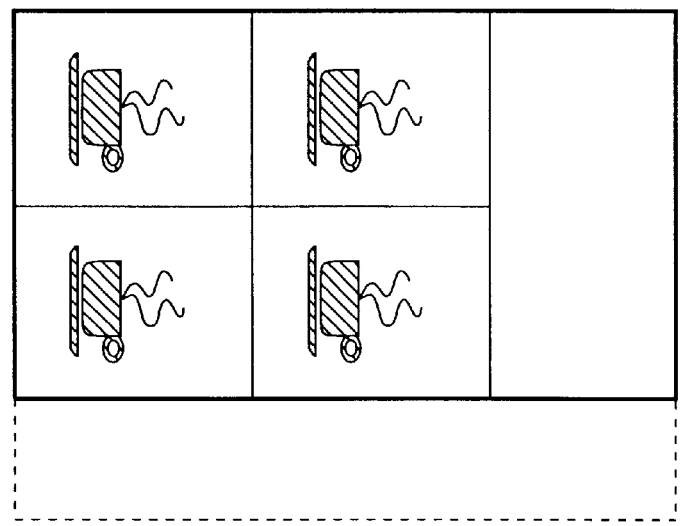
FIG. 18 illustrates an image layout in a case where images are printed on two rows in a rotated orientation according to the third embodiment.
Figure 19:
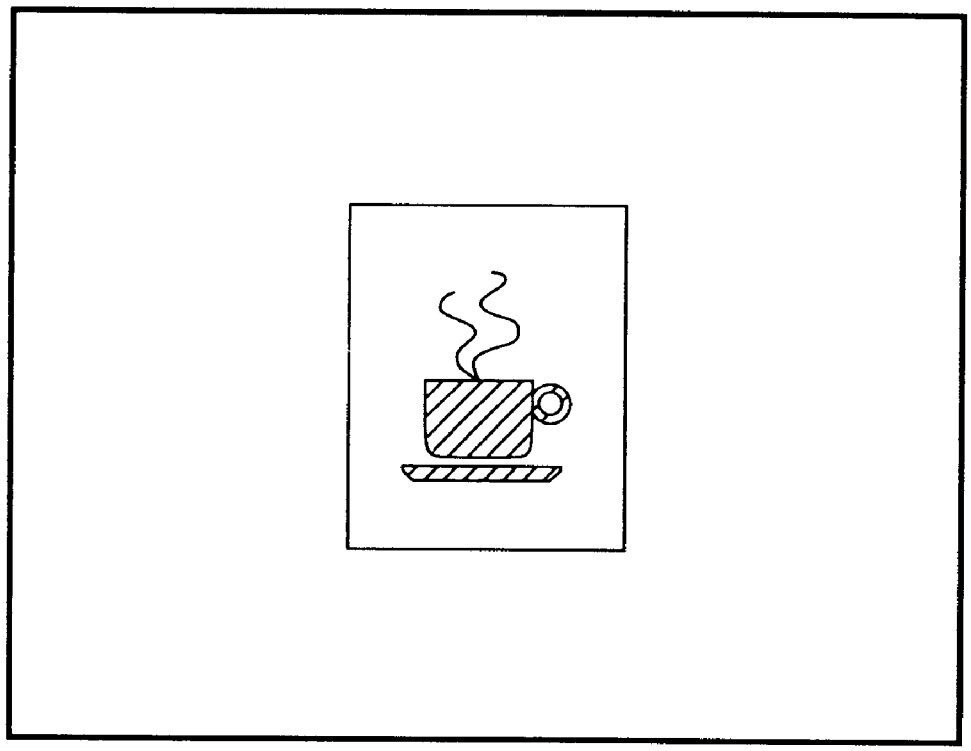
FIG. 19 illustrates a layout of a print image according to the prior art.

Finally, the optimum layouts for the unrotated and rotated orientations are compared and the layout of the rotated orientation, which has the smaller blank portion, is selected as the optimum layout. The result of printing with this layout, therefore, is as shown in FIG. 18.

Thus, images can be formed efficiently even in a case where the printing paper is paper in roll form.

Other Embodiment

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

Figure 4:
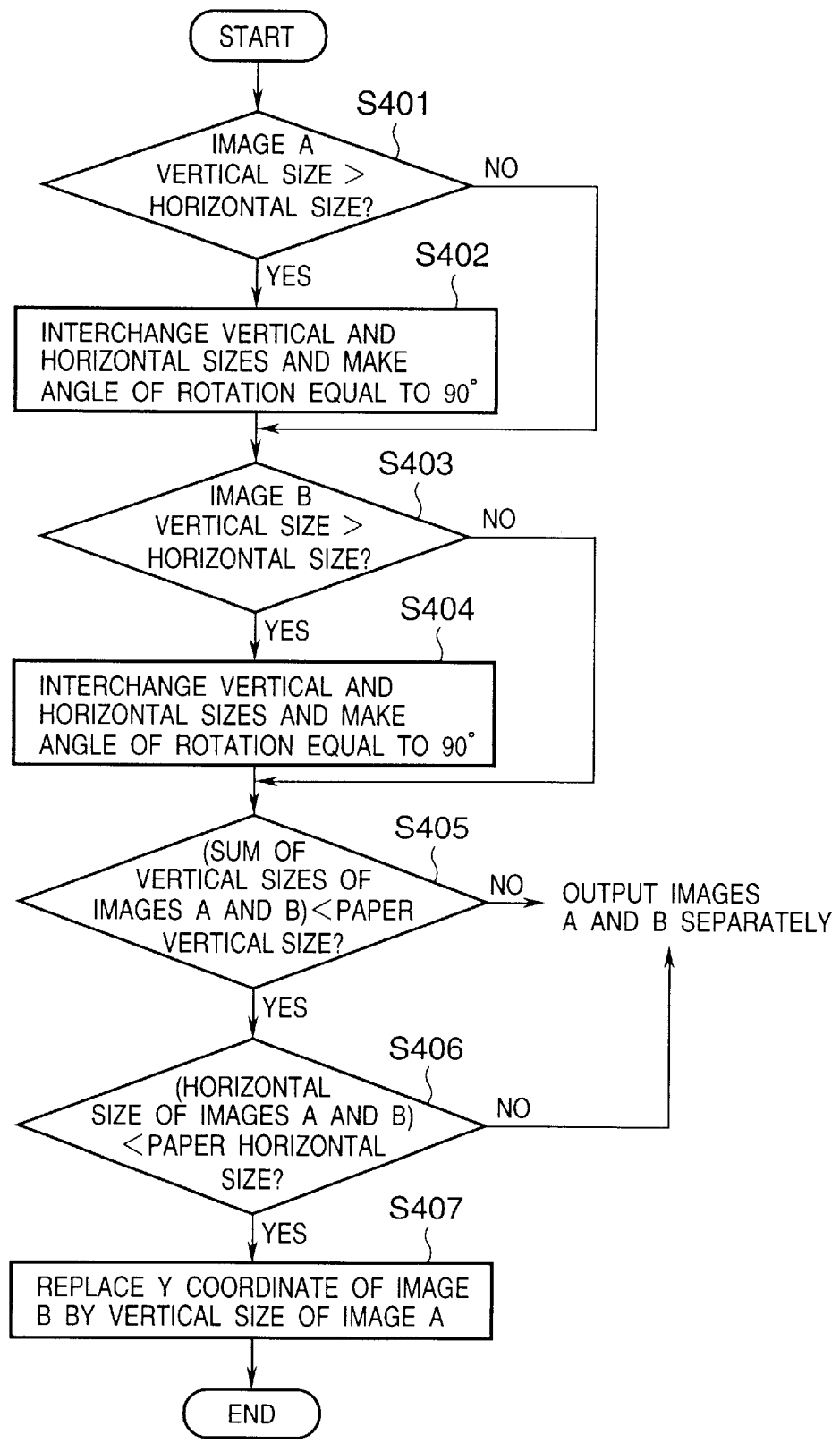
FIG. 4 is a flowchart illustrating reconfiguration of script in page description language according to the first embodiment.

In a case where the present invention is applied to the above-mentioned storage medium, program code corresponding to the flowcharts described earlier is stored on the storage medium. That is, it will suffice if program code for implementing the flowchart of FIG. 4 or 7 is stored on the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for printing a plurality of images on a printing medium of a prescribed size, comprising:

an image-printing instructing step, of instructing printing upon designating a plurality of images and the size of the printing medium;

a comparison step, of calculating image size from data representing the plurality of images designated in said image-printing instructing step and comparing the image size with the size of the printing medium;

a layout step, of deciding a layout of the plurality of images on the printing medium based upon a result of the comparison performed in said comparison step;

a printing step, of printing the plurality of images on the printing medium, in the layout decided at said layout step; and a timekeeping step, of starting measurement of time in response to the instructions given in said image-printing instructing steps, wherein said layout step is executed in a case where a plurality of images to be printed are designated before a predetermined period of time is measured in said timekeeping step.

2. The method according to claim 1, further comprising an image rotation step, of obtaining data in a case where the images are rotated, wherein said comparison step includes calculating the image size from data representing the image after it has been rotated in said image rotation step and comparing the image size after rotation with the size of the printing medium.

3. The method according to claim 1, wherein said image rotation step includes comparing the vertical size and horizontal size of the plurality of images and laying out the images upon rotating them in dependence upon the result of the comparison.

4. The method according to claim 1, wherein said layout step includes deciding the layout by reconfiguring attribute data of the plurality of images.

5. The method according to claim 2, further comprising a step of comparing the area of the blank portion in a case where the images have been laid out in a first orientation with the area of the blank portion in a case where the images have been laid out in a second orientation obtained by rotating the first orientation through a predetermined angle.

6. An image processing apparatus for printing a plurality of images on a printing medium of a prescribed size, comprising:

image-printing instructing means for instructing printing upon designating a plurality of images and the size of the printing medium;

comparison means for calculating image size from data representing the plurality of images designated by said image-printing instructing means and comparing the image size with the size of the printing medium;

layout means for deciding a layout of the plurality of images on the printing medium based upon a result of the comparison performed by said comparison means;

printing means for printing the plurality of images on the printing medium, in the layout decided by said layout means; and timekeeping means for starting measurement of time in response to the instructions given by said image-printing instructing means, wherein layout of the plurality of images is decided in a case where a plurality of images to be printed are designated before a predetermined period of time is measured by said timekeeping means.

7. The apparatus according to claim 6, further comprising image rotation means for obtaining data in a case where the images are rotated, wherein said comparison means calculates the image size from data representing the image after it has been rotated by said image rotation means and compares the image size after rotation with the size of the printing medium.

8. The apparatus according to claim 6, wherein said image rotation means compares the vertical size and horizontal size of the plurality of images and lays out the images upon rotating them in dependence upon the result of the comparison.

9. The apparatus according to claim 6, wherein said layout means decides the layout by reconfiguring attribute data of the plurality of images.

10. The apparatus according to claim 7, further comprising means for comparing the area of the blank portion in a case where the images have been laid out in a first orientation with the area of the blank portion in a case where the images have been laid out in a second orientation obtained by rotating the first orientation through a predetermined angle.

11. A storage medium storing a program for implementing an image processing method for printing a plurality of images on a printing medium of a prescribed size, said program comprising:

an image-printing instructing step, of instructing printing upon designating a plurality of images and the size of the printing medium;

a comparison step, of calculating image size from data representing the plurality of images designated in said image-printing instructing step and comparing the image size with the size of the printing medium;

a layout step, of deciding a layout of the plurality of images on the printing medium based upon a result of the comparison performed in said comparison step;

a printing step, of printing the plurality of images on the printing medium, in the layout decided in said layout step; and a timekeeping step, of starting measurement of time in response to the instructions given in said image-printing instructing step, wherein said layout step is executed in a case where a plurality of images to be printed are designated before a predetermined period of time is measured in said timekeeping step.

12. The method according to claim 1, wherein, in said printing step, the images designated in said image-printing instructing step are printed when the predetermined period of time is measured in said timekeeping step.

13. An image processing method for printing a plurality of images on a printing medium of a prescribed size, comprising:

an image designating step, of designating images to be printed;

a comparison step, of calculating image size from data representing the plurality of images designated in said image designating step and comparing the image size with the size of the printing medium;

a layout step, of deciding a layout of the plurality of images on the printing medium based upon a result of the comparison performed in said comparison step;

a printing step, of printing the plurality of images on the printing medium, in the layout decided in said layout step; and a timekeeping step, of stating measurement of time in response to the designation of images in said image designating step, wherein said layout step is executed in a case where a plurality of images to be printed are designated before a predetermined period of time is measured in said timekeeping step.

14. The method according to claim 13, wherein, in said printing step, the images designated in said image-printing instructing step are printed when the predetermined period of time is measured in said timekeeping step.

15. The method according to claim 13, further comprising an image rotation step, of obtaining data in a case where the images are rotated, wherein said comparison step includes calculating the image size from data representing the image after it has been rotated in said image rotation step and comparing the image size after rotation with the size of the printing medium.

16. The method according to claim 13, wherein said image rotation step includes comparing the vertical size and horizontal size of the plurality of images and laying out the images upon rotating them in dependence upon the result of the comparison.

17. The method according to claim 13, wherein said layout step includes deciding the layout by reconfiguring attribute data of the plurality of images.

18. The method according to claim 14, further comprising a step of comparing the area of the blank portion in a case where the images have been laid out in a first orientation with the area of the blank portion in a case where the images have been laid out in a second orientation obtained by rotating the first orientation through a predetermined angle.

19. An image processing apparatus for printing a plurality of images on a printing medium of a prescribed size, comprising:

an image designator, adapted to designate images to be printed;

a comparison unit, adapted to calculate image size from data representing the plurality of images designated by said image designator and to compare the image size with the size of the printing medium;

a layout unit, adapted to decide a layout of the plurality of images on the printing medium based upon a result of the comparison performed by said comparison unit;

a printing unit, adapted to print the plurality of images on the printing medium, in the layout decided by said layout unit; and a timekeeping unit, adapted to state measurement of time in response to the designation of images by said image designator, wherein said layout unit operates in a case where a plurality of images to be printed are designated before a predetermined period of time is measured by said timekeeping unit.

20. The apparatus according to claim 19, wherein, in said printing unit, the images designated by said image designator are printed when the predetermined period of time is measured by said timekeeping unit.

21. The apparatus according to claim 19, further comprising an image rotation unit, adapted to obtain data in a case where the images are rotated, wherein said comparison unit calculates the image size from data representing the image after it has been rotated by said image rotation unit and compares the image size after rotation with the size of the printing medium.

22. The apparatus according to claim 19, wherein said image rotation unit compares the vertical size and horizontal size of the plurality of images and lays out the images upon rotating them in dependence upon the result of the comparison.

23. The apparatus according to claim 19, wherein said layout unit decides the layout by reconfiguring attribute data of the plurality of images.

24. The apparatus according to claim 20, further comprising an area comparison unit, adapted to compare the area of the blank portion in a case where the images have been laid out in a first orientation with the area of the blank portion in a case where the images have been laid out in a second orientation obtained by rotating the first orientation through a predetermined angle.

* * * * *